US006279218B1

(12) United States Patent
Lezuch et al.

(10) Patent No.: US 6,279,218 B1
(45) Date of Patent: Aug. 28, 2001

(54) MAGNETIC STRIKER FIXTURE

(75) Inventors: Lawrence J. Lezuch, Sterling Heights; James N. Owens, II, Wayne; Lawrence A. Warren, Gross Pointe, all of MI (US); Edward A. Dickens; Thomas P. Ouellette, both of LaSalle (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/394,744

(22) Filed: Sep. 13, 1999

(51) Int. Cl.[7] .............................. B25B 27/00; B23Q 3/18

(52) U.S. Cl. .......................... 29/281.5; 29/281.4; 29/271; 29/468; 29/464

(58) Field of Search .......................... 29/464, 468, 281.4, 29/281.5, 271

(56) References Cited

U.S. PATENT DOCUMENTS 3,082,473 * 3/1963 West .
4,451,071 5/1984 Striese et al. .
4,989,313 2/1991 Dzurko et al. .
4,999,599 3/1991 Spier .
5,282,305 2/1994 Nutt et al. .
5,653,012 8/1997 Pasternak et al. .
5,694,675 12/1997 Pasternak et al. .
6,029,335 * 2/2000 Hui et al. .............................. 29/464

FOREIGN PATENT DOCUMENTS 5-221347 * 8/1993 (JP) .

* cited by examiner

*Primary Examiner*—I Cuda Rosenbaum
*Assistant Examiner*—Eric Compton
(74) *Attorney, Agent, or Firm*—Roland A Fuller III

(57) ABSTRACT

A magnetic striker alignment fixture for aligning a striker with a latch on a door jamb, and a method of use therefor, is described. The fixture includes a substantially planar base of rigid material having an area defining an aperture sized to tightly receive the striker and position the striker in the plane parallel to the base. At least one magnet is disposed on at least one surface of the base so as to hold the base adjacent to the door jamb, with the base being parallel to the door jamb thereby positioning the striker on the door jamb and restricting motion of the striker in the plane of the surface of the door jamb. Optionally, a handle can either be pivotally attached to the base or formed on a surface of the base, so as to permit the fixture to be easily removed from the door jamb. Additionally, an optional elongated member extending from at least one surface of the base can be provided to function as a locator pin and anti-rotation device. The magnet permits the base to move simultaneously with the striker when sufficient force is applied against the striker in the plane parallel to the door jamb to overcome the magnet holding the base so that the position of the striker may be adjusted to a desired position.

5 Claims, 3 Drawing Sheets

MAGNETIC STRIKER FIXTURE

BACKGROUND OF THE INVENTION

FIELD OF THE INVENTION

The present invention relates generally to automobile doors and, more particularly, to a method and apparatus for aligning a striker with a latch on an automobile door.

BACKGROUND AND SUMMARY OF THE INVENTION

An automobile typically includes one or more selectively operable closure panels (e.g., doors, hatches, lids, liftgates, hoods, and the like) that are swingingly or pivotally fastened to one or more frame members of the automobile. The selectively operable door allows operators and passengers convenient ingress into, and egress from, the interior or passenger compartment of the automobile. The door typically includes a closure assembly for preventing the inadvertent or unintended deployment of the door from a closed to an open position.

Typically, the closure assembly includes a panel having a selectively operable latch that engages a striker positioned on the vehicle body of the automobile. In one typical configuration, the latch includes an engaging member (e.g., a rod, hook, or the like), whereas the striker comprises a C-shaped (or post-shaped) member. To retain the door in a closed position, the door latch is positioned in such a manner so as to engage the striker, which is mounted on a door frame of the automobile body (e.g., the "B" pillar).

Motor automobile manufacturers, in response to increased consumer expectations, are continuously attempting to improve their automobiles in areas such as fit and finish (e.g., striker drag, seal effort, door flushness, and the like), and quietness issues (e.g., buzz, squeeks, rattles ("BSR") and the like). For example, the fit of a door to a body panel, the effort needed to close the door, or the quietness of the door can all be enhanced by proper alignment of the door latch and striker. The door latch and striker alignment may be determined during the vehicle assembly process. In one example of an automobile assembly process, an assembler, using a trial and error process, initially positions the striker, so that the striker is engaged by the door latch when the door is closed. The assembler tightens a retaining fastener (e.g., a screw) for the striker, and shuts the door. If the door is difficult to close, or the door is not flush with the vehicle body panel, the assembler continues to adjust the position of the striker and test the door, until the striker alignment is improved.

Because the dimensional relationship between the striker and latch should be strictly maintained to minimize door closing efforts, striker drag, door flushness, and door related noises, the trial and error methodology is time-consuming and inaccurate. The problem of misaligned or poorly aligned automobile doors can lead to consumer dissatisfaction, poor trade group reviews, and increased warranty claims. Accordingly, the automotive industry recognized the need for improving the alignment of the striker with the latch.

Various methods and devices have been suggested as possible solutions to this problem. Of particular note is U.S. Pat. No. 4,989,313 issued to Dzurko et al. and entitled "Magnetic Alignment Fixture" which discloses a magnetic alignment fixture to temporarily hold a door latch striker in position relative to a door jamb while the alignment of the doors is adjusted. The magnetic alignment fixture includes a base plate of flexible material having an aperture for receiving and positioning the striker. The base plate magnetically holds the striker on the door jamb. The base plate may be moved by sufficient force applied against the striker in the plane parallel to the door jamb to overcome the magnetic force holding the base plate and thereby adjusts the position of the striker. The entire disclosure of U.S. Pat. No. 4,989,313 is incorporated herein by reference.

However, the magnetic alignment fixture disclosed in the U.S. Pat. No. 4,989,313 suffers from several drawbacks and deficiencies. First, the alignment fixture does not limit the amount of cross/car movement. As a result, there is no limit or control to prevent a door from going underflush to the pillar. This makes the striker alignment process much more assembler dependent, thus increasing the potential for misalignment.

Second, the alignment fixture employs either rubber or a flexible magnetic material as the means for temporarily retaining the fixture on the pillar. In practice, this configuration does not retain the striker effectively with the dynamics that occur during the striker installation process (i.e. torque effect and assembler handling). Thus, the alignment fixture can inadvertently rotate or otherwise move out of position when the striker is being screwed or otherwise fastened into place.

Third, the alignment fixture does not include a convenient method of quickly and easily removing the striker fixture from the pillar once the striker has been aligned and installed. Thus, the alignment fixture must be "peeled" away from the pillar. This is a difficult task if the assembler is wearing gloves or other protective hand gear.

Other examples of methods and devices relating generally to striker alignment technology include:

U.S. Pat. No. 4,451,071 issued to Striese et al. and entitled "Adjustable Strike" which discloses an adjustable strike. The strike incorporates a bracket defining a slide, a striker plate including a latch-engaging section and an integral slider slidably positioned in the slide, and an adjusting screw recessed in the bracket underneath the slide. The screw has a head accessible at an edge of the bracket and a thread threadedly engaging the slider. Projections are provided at the opposite sides of the slide which overhang the edge margins of the slider to slidably retain the slider in the slide. The parts can be assembled by placing the screw in the bracket recess and engaging an edge of the striker plate slider under the projections at one side of the slide and pressing the slider down into the slide whereupon its opposite side edge becomes engaged under the projections at the opposite side of the slide. The entire disclosure of U.S. Pat. No. 4,451,071 is incorporated herein by reference.

U.S. Pat. No. 4,999,599 issued to Spier and entitled "Magnetic Switch And Latch For Vehicle Accessories" which discloses a magnetic switch assembly for an electrical circuit which includes a switch housing with a cavity formed therein and at least one magnetically attractable electrical contact member exposed within the cavity. One or more electrically-conductive magnetic pole members are movably disposed within the cavity, with a magnet being secured to the pole members for movement therewith. The pole member or members and the magnet are movable in the cavity between a first position in electrical contact with the contact member in order to complete electrical continuity of the electrical circuit. A movable and magnetically attractable striker member is disposed for movement toward and away from the switch housing cavity, such that as on a pivotal or hinged accessory cover. The magnetic attraction between the magnet (and pole members) and the striker member moves the pole members and the magnet into the second, circuit-breaking position whenever the striker member is moved within a predetermined distance from the cavity. The entire disclosure of U.S. Pat. No. 4,999,599 is incorporated herein by reference.

U.S. Pat. No. 5,282,305 issued to Nutt et al. and entitled "Method Of Aligning A Striker Plate With A Latch Body Of A Door Latch Mechanism" which discloses a method for individually setting the position of a door striker plate relative to the latch body which has to engage with the striker plate. The tool comprises a plate which locates around the striker plate, and which can be clamped by means of vacuum to the door pillar at any position. The method provides that the striker plate is loosely secured to the door pillar, the door is closed so that the latch mounted on the door moves the striker plate to the correct position for that latch, the tool is operated to clamp the striker plate in that position, the door is opened and the striker plate is tightened in that position before releasing the tool. The entire disclosure of U.S. Pat. No. 5,282,305 is incorporated herein by reference.

U.S. Pat. Nos. 5,653,012 and 5,694,675, both issued to Pasternak et al. and entitled "Vehicle Latch Striker Centering Device" and "Method Of Centering A Vehicle Latch Striker", respectively, which disclose a method and device for locating a striker on a vehicle body in position for engagement with a latch on a closure mounted on the vehicle body for swinging movement from an open position to a closed and latched position. The device comprises a central frame, and a pair of elongated, rigid support bars. The inner ends of the bars are pivoted to the frame for swinging movement between a retracted position and an operative position in which the bars extend in opposite directions laterally outwardly from the frame in substantial alignment with one another. A spring mounted foot on the outer end of each bar is adapted to support the device on the vehicle body when the bars are in their operative positions. A striker locator is attached to the frame. The entire disclosures of U.S. Pat. Nos. 5,653,012 and 5,694,675 are incorporated herein by reference.

Although the aforementioned methods and devices have aided somewhat in improving striker alignment, they have not disclosed a device and method for using the same which achieves the desired level of striker alignment without the need for expensive and complex equipment and time-consuming methods of using the same.

Therefore, there exists a need for a method and apparatus for quickly, easily, and accurately aligning a striker with a latch on a closure panel, such as, but not limited to an automobile door.

In accordance with one embodiment of the present invention, a magnetic alignment fixture for temporarily holding a striker in a position relative to a door jamb having at least one area defining an aperture is provided, the magnetic alignment fixture comprising:

a substantially planar base of rigid material having an area defining an aperture sized to tightly receive the striker and position the striker in the plane parallel to the base; and at least one magnet disposed on at least one surface of the base so as to hold the base adjacent to the door jamb, with the base being parallel to the door jamb thereby positioning the striker on the door jamb and restricting motion of the striker in the plane of the surface of the door jamb;

wherein the magnet permits the base to move simultaneously with the striker when sufficient force is applied against the striker in the plane parallel to the door jamb to overcome the magnet holding the base so that the position of the striker may be adjusted to a desired position.

In accordance with another embodiment of the present invention, a magnetic alignment fixture for temporarily holding a striker in a position relative to a door jamb having at least one area defining an aperture is provided, the magnetic alignment fixture comprising:

a substantially planar base of rigid material having an area defining an aperture sized to tightly receive the striker and position the striker in the plane parallel to the base;

at least one magnet disposed on at least one surface of the base so as to hold the base adjacent to the door jamb, with the base being parallel to the door jamb thereby positioning the striker on the door jamb and restricting motion of the striker in the plane of the surface of the door jamb; and a handle attached to the base;

wherein the magnet permits the base to move simultaneously with the striker when sufficient force is applied against the striker in the plane parallel to the door jamb to overcome the magnet holding the base so that the position of the striker may be adjusted to a desired position.

In accordance with still another embodiment of the present invention, a magnetic alignment fixture for temporarily holding a striker in a position relative to a door jamb having at least one area defining an aperture is provided, the magnetic alignment fixture comprising:

a substantially planar base of rigid material having an area defining an aperture sized to tightly receive the striker and position the striker in the plane parallel to the base;

at least one magnet disposed on at least one surface of the base so as to hold the base adjacent to the door jamb, with the base being parallel to the door jamb thereby positioning the striker on the door jamb and restricting motion of the striker in the plane of the surface of the door jamb;

a handle attached to the base; and an elongated member extending from at least one surface of the base;

wherein the magnet permits the base to move simultaneously with the striker when sufficient force is applied against the striker in the plane parallel to the door jamb to overcome the magnet holding the base so that the position of the striker may be adjusted to a desired position.

In accordance with yet another embodiment of the present invention, a method for aligning a striker with a latch on a door jamb is provided, comprising:

placing a magnetic alignment fixture on at least a surface of the door jamb, wherein the fixture is adjacent and parallel to the surface of the door jamb, wherein the fixture comprises a substantially planar base of rigid material having an area defining an aperture sized to tightly receive the striker and at least one magnet disposed on at least one surface of the base so as to hold the base adjacent to the door jamb;

positioning the striker in the aperture in the plane parallel to the base;

closing the door so as to cause at least one surface of the latch to engage at least one surface of the striker; and opening the door so as to cause the latch to disengage from the striker.

In accordance with still yet another embodiment of the present invention, a method for aligning a striker with a latch on a door jamb is provided, comprising:

placing a magnetic alignment fixture on at least a surface of the door jamb, wherein the fixture is adjacent and parallel to the surface of the door jamb, wherein the fixture comprises a substantially planar base of rigid material having an area defining an aperture sized to tightly receive the striker and at least one magnet disposed on at least one surface of the base so as to hold the base adjacent to the door jamb;

positioning the striker in the aperture in the plane parallel to the base;

closing the door so as to cause at least one surface of the latch to engage at least one surface of the striker, wherein the magnet permits the base to move simultaneously with the striker when sufficient force is applied against the striker in the plane parallel to the door jamb to overcome the magnet holding the base so that the position of the striker may be adjusted to a desired position;

opening the door so as to cause the latch to disengage from the striker; and securing the striker to the door jamb.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from the detailed description.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

Figure 1:
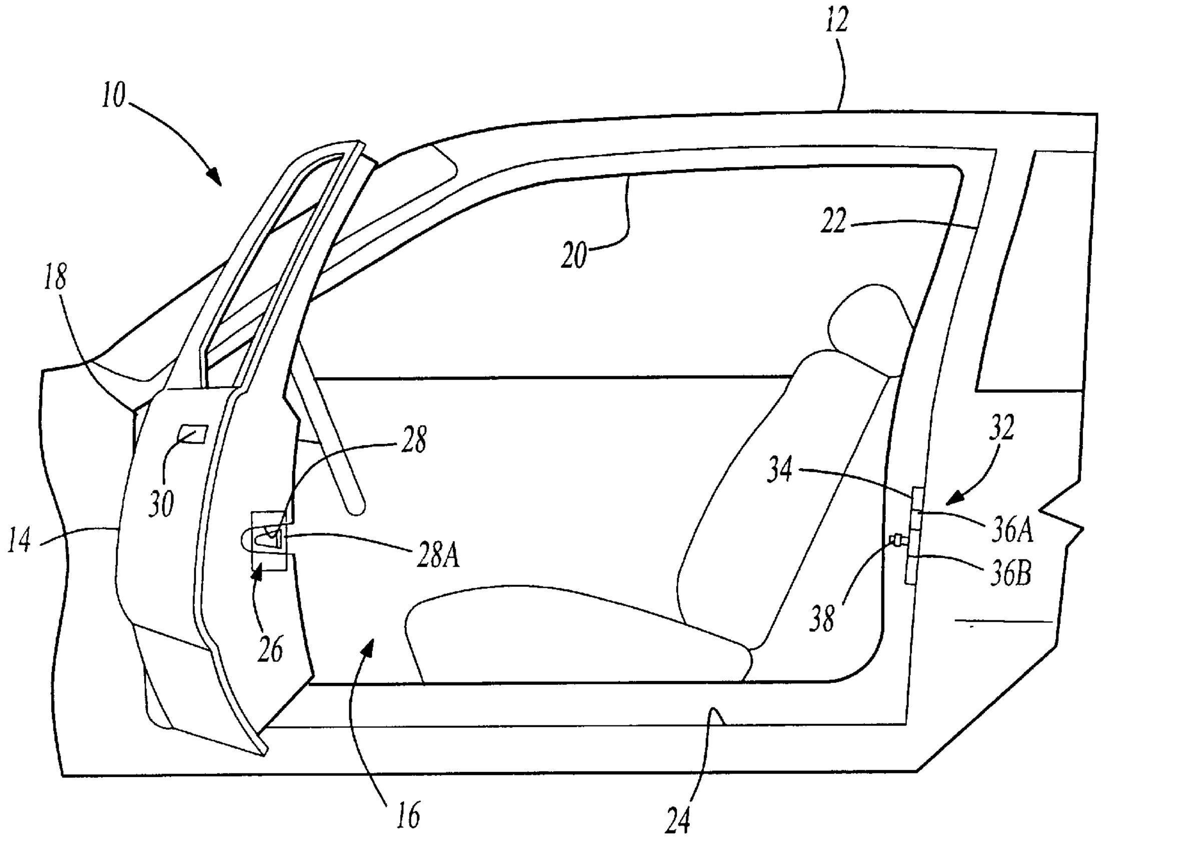
FIG. 1 is partial side elevational view of a typical automobile.

Referring to FIG. 1, a typical automobile 10, such as a sedan, is illustrated. The automobile 10 generally includes a vehicle body 12 formed from a plurality of panels and members which generally define the overall structural shape and appearance of the automobile. The automobile body 12 generally includes at least one closure panel portion, such as a door 14.

The door 14 typically encloses a door opening 16. The door opening 16 is generally defined by a vertically extending first side 18, a horizontally extending top side 20, a vertically extending second side 22 spaced and opposed from the first side 18, and a horizontally extending bottom side 24 spaced and opposed from the top side 20. The door 14 is pivotally mounted to the first side 18 by a suitable device such as a hinge (not shown). The door 14, in a closed position, is retained to the second side 22, in a manner to be described, such that in a closed position the door 14 and automobile body 12 form a relatively generally planar surface.

The door 14 typically includes a latch 26 for maintaining the door 14 in a closed position. The latch 26 typically includes a striker retaining portion 28, defining a generally U-shaped opening. The latch 26 also includes an engaging mechanism 28A within the striker retaining portion 28. The engaging mechanism 28A is operably connected to a door handle 30 positioned on the door 14.

The automobile body 12 typically includes a striker 32 mounted to the second side 22. The striker 32 includes a plate portion 34 having at least one attachment opening therein for attaching the plate to the second side 22. Preferably, there are two spaced and opposed attachment openings 36A and 36B, respectively, and the plate portion 34 is secured to the second side 22 using a fastener such as a screw, bolt, or the like. The striker 32 includes a C-shaped member 38 extending outwardly perpendicular to the plate portion 34. Preferably, the C-shaped member 38 is circular in cross-sectional shape.

To close the door 14, the door 14 is directed in a closing direction, until the striker's 32 C-shaped member 38 is fixedly engaged within the striker retaining portion 28 by the engaging mechanism 28A. To open the door 14, the door handle 30 is moved to disengage the engaging mechanism 28A from the striker's 32 C-shaped member 38, so that the door 14 can pivot in an open direction. If the striker 32 is not properly aligned, it will be difficult to easily close, open, and/or lock the door 14 without problems arising.

Figure 2:
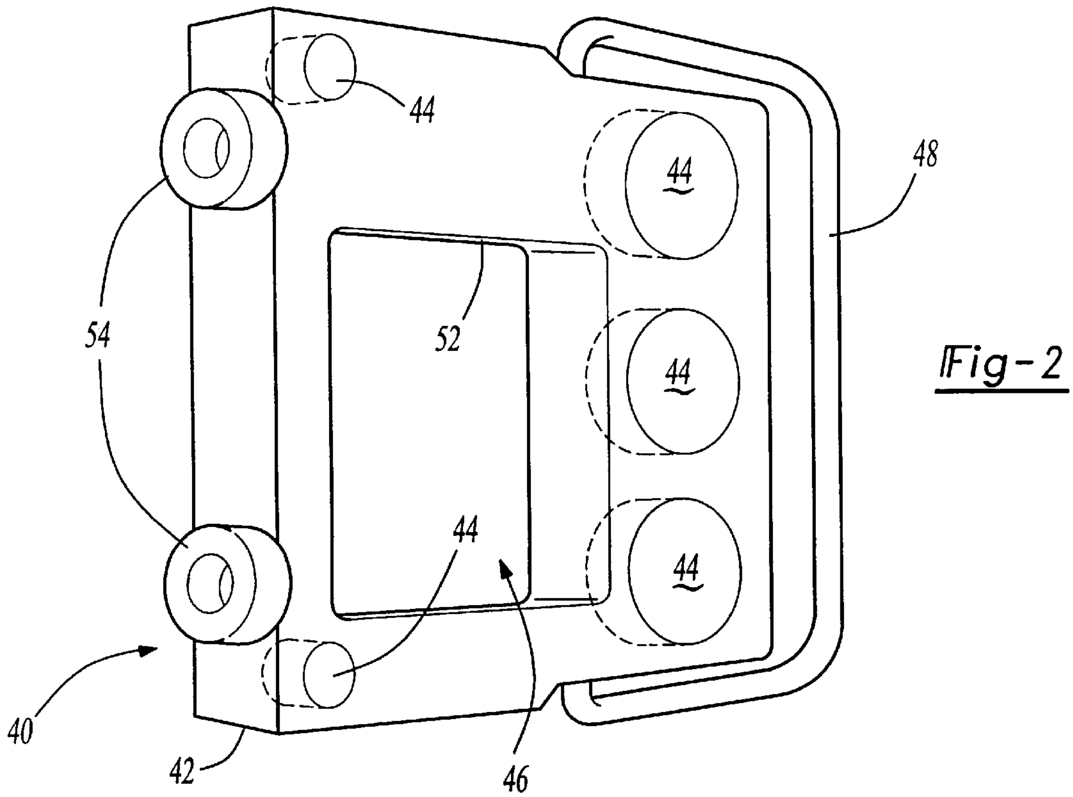
FIG. 2 is a front perspective view of a magnetic striker fixture, in accordance with one aspect of the present invention.

In accordance with one embodiment of the present invention, a magnetic striker fixture 40 is illustrated in FIG. 2. The magnetic striker fixture 40 of the present invention permits the quick and accurate installation of the striker 32 onto the second side 22, which is part of the door jamb, specifically the "B" pillar. As that term is used herein, the term "door jamb" is meant to refer to any surface of any opening, whether for a door, hatch, lid, liftgate, hood, and the like, that is intended to engage, abut, or mate with any type of closure panel. Accordingly, it should be noted that the present invention can be practiced on any type of surface or structure that requires the installation of any type of striker.

The fixture 40 is comprised primarily of two major components: a base 42 and at least one magnet 44.

The base 42 is a substantially planar member of rigid material having an area defining an aperture 46 sized to tightly receive the striker 32 and position the striker 32 in the plane parallel to the base 42. The size and configuration of the aperture 46 will be dependent, in great part, on the size and configuration of the striker 32, especially the plate portion 34. Thus a striker 32 with a round plate portion 34 will generally require the use of a fixture 40 having an round aperture 46, and so forth. The base 42 preferably has a shallow profile in order to provide the requisite clearance to the door 14.

The material comprising the base 42 may include any rigid material, or combination of rigid materials, such as, but not limited to, metals (e.g., aluminum) and/or thermoplastics (e.g., nylon). Additionally, several layers of these materials may be laminated together to form a composite.

The other major component of the fixture 40, the magnet 44, is disposed on at least one surface of the base 42 so as to hold the base 42 adjacent to the door jamb 22, with the base 42 being parallel to the door jamb 22 thereby positioning the striker 32 on the door jamb 22 and restricting motion of the striker 32 in the plane of the surface of the door jamb 22. This is due to the fact that the attractive force of the magnet 44 permits the base 42 of the fixture 40 to adhere to the door jamb 22, which is typically comprised of a metallic material.

Preferably, at least one magnet 44 is employed, still more preferably at least two magnets 44 are employed, and most preferably a plurality of magnets 44 are employed. If more than one magnet 44 is employed, they should preferably be spaced apart and opposed so as to provide sufficient resistance to rotation when a torque load is applied to the striker 32 (e.g., when the striker 32 is being screwed into the door jamb 22). By way of a non-limiting example, the magnets 44 may be arranged in a line, a circle, placed at the corners of the fixture, or any combination thereof. Although the magnets 44 are shown as being round, it should be noted that any configuration (e.g., squares, rectangles, ovals, and so forth) may be used.

The magnets 44 permit the base 42 to move simultaneously with the striker 32 when sufficient force is applied against the striker 32 in the plane parallel to the door jamb 22 to overcome the magnetic force holding the base 42 to the door jamb 22 so that the position of the striker 32 may be adjusted to a desired, and preferably final, position on the door jamb 22. The magnets 44 may be permanent magnets (e.g., rare earth permanents magnets) and/or electromagnets that may be selectively operable (e.g., switch or foot pedal actuated).

The use of rare earth permanent magnets and/or electromagnets permit about 30 to about 1000 lbs., and preferably about 50 to about 70 lbs., of magnetic force to be acheived by the fixture 40. By way of a non-limiting example, this magnetic force generates enough friction to overcome the 6–7 lbs. of frictional force that it takes to close the typical automobile door 14 so that the latch 26 engages the striker 32 (e.g., coefficient of Friction (0.15)× Normal Force (50 lbs.)= Friction Force (7.5 lbs.)). For more demanding applications, the magnetic force of the fixture 40 can be increased accordingly. While in the closed position, the door 14 is set flush to the outer surface of the automobile body 12 and will remain flush because there is enough frictional force to overcome the frictional forces in the latch system.

With respect to the use of electromagnets, a selectively operable electromagnetic system (not shown) may be employed to generate a two stage magnetic force which could reference the seal gap or the door outer skin through the use of a switch. By way of a non-limiting example, the electromagnetic force can initially start at 50 lbs. and then be increased to 100 lbs. when the desired seal gap or the door flushness is achieved. This system will positively locate the door inboard and outboard and it will help prevent any torque effect issues.

The fixture 40 of the present invention may be provided with several optional features such as a handle 48. The handle 48 may be pivotally fastened or attached to the base 42 so as to permit the assembler to grab it in order to quickly and conveniently remove the fixture 40 from the door jamb 22 after installation of the striker 32 is complete.

Figure 3:
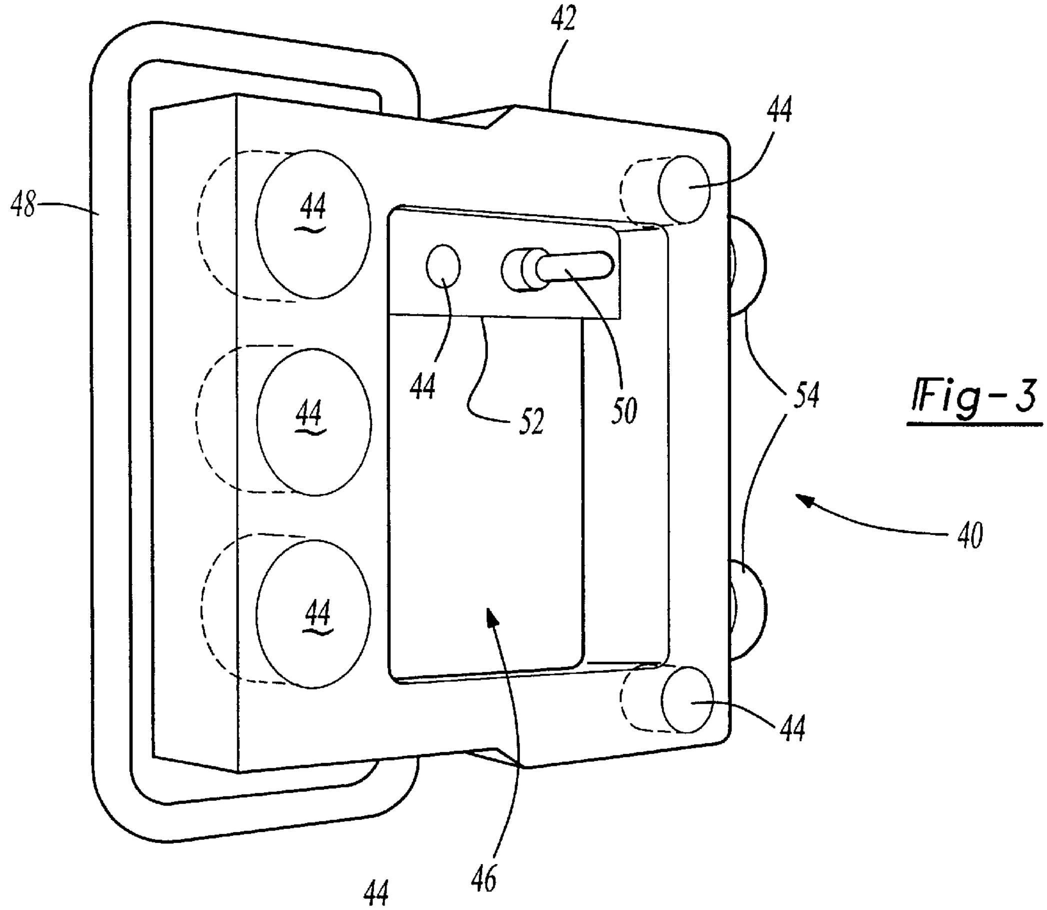
FIG. 3 is a rear perspective view of the magnetic striker fixture depicted in FIG. 2, in accordance with one aspect of the present invention.

With reference to FIGS. 2 and 3, another optional feature is an elongated member 50 which extends from at least one surface of the base 42. In this embodiment, a plate member 52 is provided on the front surface of the base 42 in proximity to a portion of the aperture 46 so as to not substantially interfere with the reception of the striker 32 within the aperture 46. It should be noted that the plate member 52 may be formed from a separate piece of material that is fastened to the base 42, or alternatively, the plate member 52 may be formed from a portion of the base 42. On the rear surface of the plate member 52, the elongated member 50 extends outwardly away therefrom. Preferably, the elongated member 50 extends through and is received by one of the attachment openings 36A or 36B. Optionally, a magnet 44 may be disposed on the surface of the plate member 50.

The elongated member 52 can function as a locator pin so as to permit the initial placement of the fixture 40 on the door jamb 22 in proximity to any pre-drilled screw holes (if present). Additionally, the elongated member 52 can function as an anti-rotational device. For example, when the elongated member 52 passes through the upper attachment opening 36A and engages one of the pre-drilled screw holes provided on the door jamb 22, the striker 32 can have a torque load applied to it, for example, when an assembler fastens (e.g., screws) the lower portion of the striker 32 (through attachment opening 36B) onto the door jamb 22, without the possibility that the torque load will cause the striker 32 to rotate and thus misalign the striker 32. Once the lower portion of the striker 32 is secured to the door jamb 22, the fixture 40 can be removed without fear that the striker 32 will be become misaligned. The assembler may then fasten the upper portion of the striker 32 (through attachment opening 36A) to the door jamb 22. It should be noted that the depth of the aperture 46 (in this particular case as measured from the rear surface of the base 42 to the rear surface of the plate member 50) is sufficient to permit the plate portion 34 to lie flush with the surface of the door jamb 22.

Still another optional feature is the use of at least one bumper 54, preferably comprised of a resiliently deformable material such as rubber, in order to prevent chipping or scratching of the automobile paint. The bumper 54 preferably has a shallow profile in order to provide the requisite clearance to the door 14. The bumber 54 may be fastened to the fixture 40 by any suitable device, such as a screw and the like.

Figure 4:
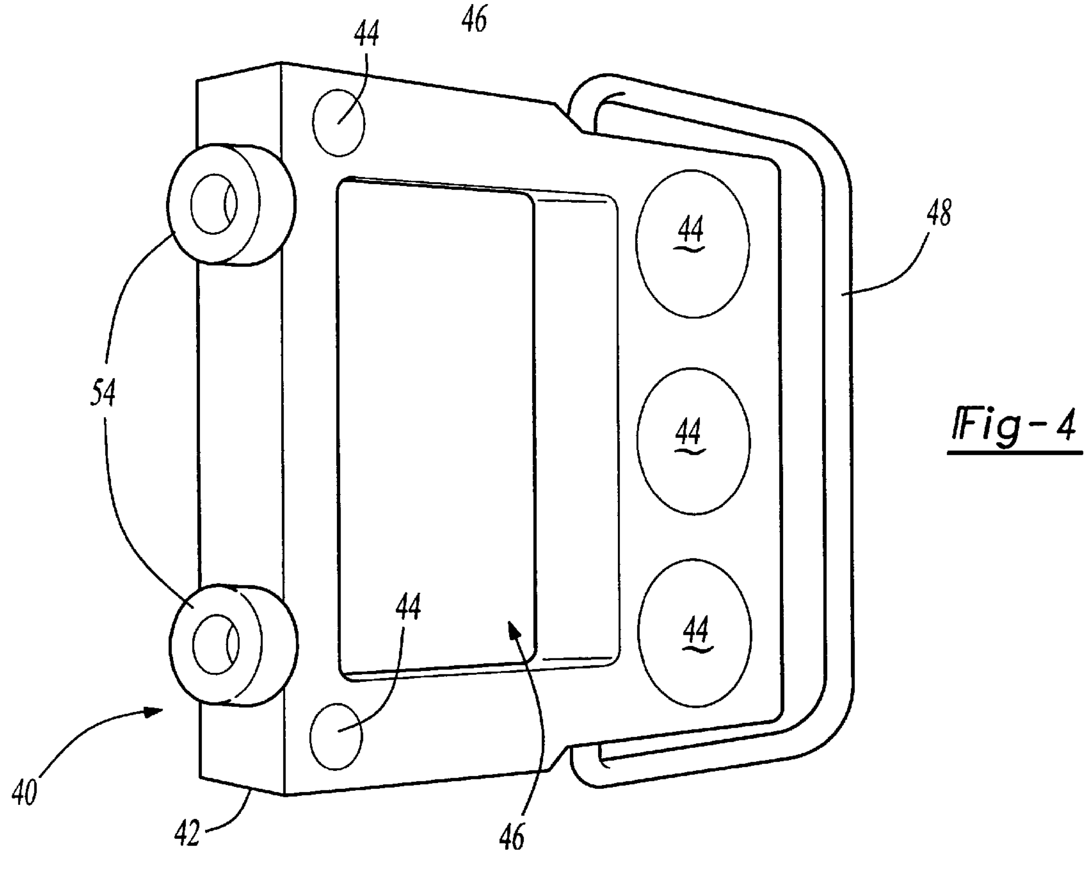
FIG. 4 is a front perspective view of an alternative version of a magnetic striker fixture, in accordance with one aspect of the present invention.

With reference to FIG. 4, an alternative version of the fixture 40 is shown without the optional elongated member 52 and the associated plate member 50. This type of fixture 40 would be preferable if pre-drilled screw holes were not provided on the door jamb 22, thus there would not be a need for the locator pin function of the optional elongated member 50.

Figure 5:
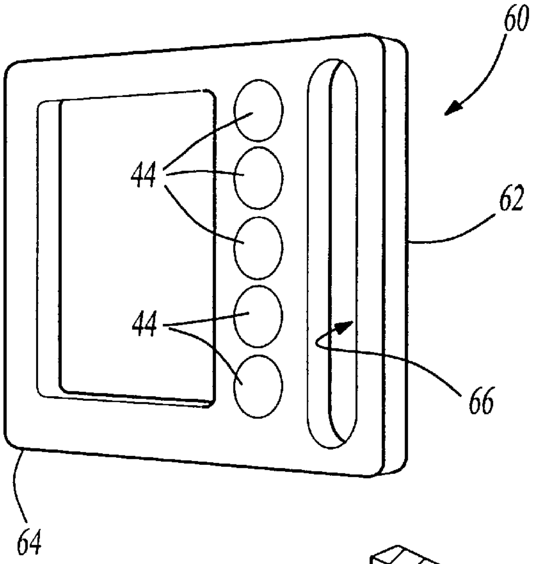
FIG. 5 is a front perspective view of another alternative version of a magnetic striker fixture, in accordance with one aspect of the present invention.

In accordance with an alternative embodiment of the present invention, in FIG. 5 there is shown an alternative fixture 60 wherein the optional handle 62 is formed from a portion of the base 64 itself. For example, an area defining an aperture 66 may be provided on one or more surface of the base 64. The handle 62 preferably has a shallow profile in order to provide the requisite clearance to the door 14. As with the fixture 40 depicted in FIG. 4, the alternative fixture 60 is shown without the optional elongated member 50 and the associated thin member 52. Additionally, the bumpers 54 are also not shown in this view; however, any of the aforementioned optional features of the present invention may be employed in any number of combinations.

Thus, in operation, the assembler simply places the striker 32 in the aperture 46 of the fixture 40 and places the fixture

Figure 6A:
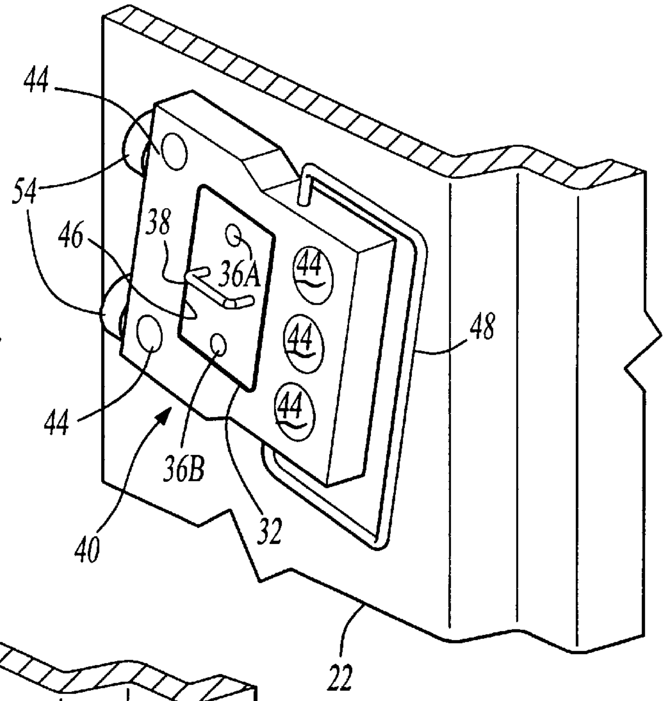
FIG. 6A is a partial perspective view of a slightly misaligned magnetic striker fixture adhering to a door jamb prior to the act of closing of the door, in accordance with one aspect of the present invention.
Figure 6B:
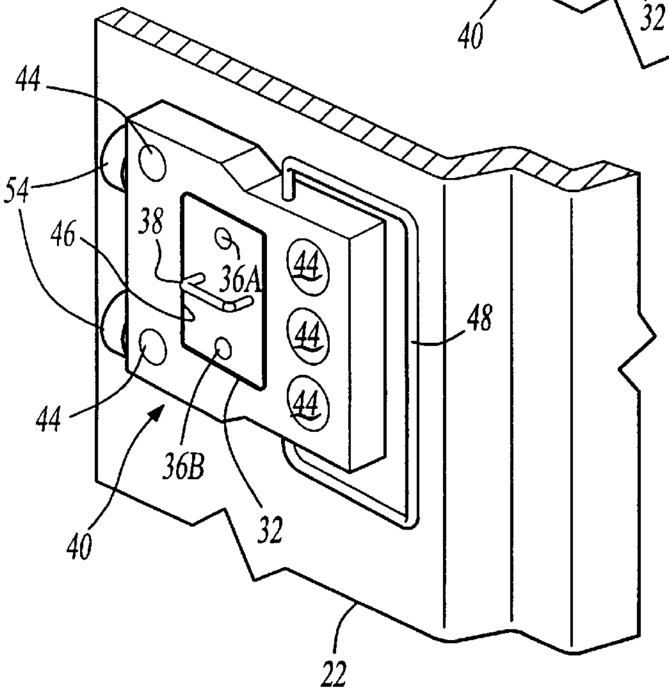
FIG. 6B is a partial perspective view of an aligned magnetic striker fixture adhering to a door jamb after the act of closing of the door, in accordance with one aspect of the present invention.

40/striker 32 assembly on the door jamb 22 in proximity to the desired location (see FIG. 6A). The fixture 40/striker 32 assembly is shown in this view as being slightly askew in relation to the door jamb 22; however, this concern will be addressed herein. When the door 14 is initially closed, the fixture 40 and the striker 32 will simultaneously move to a position on the door jamb 22 that is aligned with the latch 26 on the door 14 (see FIG. 6B). This due to the fact that the C-shaped member 38 of the striker 32 is contacted by, or otherwise engages, a surface of the latch 26, for example, the striker retaining portion 28. The striker 32 is now properly aligned with the latch 26 and will not move out of alignment due to the attractive force holding the fixture 40 on the door jamb 22. Then, when the door 14 is opened, the assembler need only fasten the striker 32 to the tapping plate (not shown) located behind the door jamb 22 in order to secure the striker 32 to the door jamb 22. This is due to the fact that the fixture 40 has a sufficient attractive force to the door jamb 22 so as to prevent any unintended movement of the striker 32 once the desired and final position has been established. Accordingly, there is no need to make any further adjustments to the position of the striker 32 once the door 14 is closed, as the act of closing the door 14 moves the striker 32 (simultaneously with the fixture 40) to the desired, and preferably final, position on the door jamb 22. Once, the striker 32 is secured to the door jamb 22, the fixture 40 is simply and conveniently pulled outwardly away from the door jamb 22 by the handle 48.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic alignment fixture for temporarily holding a striker in a position relative to a door jamb having at least one area defining an enclosed aperture, the magnetic alignment fixture comprising:

a substantially planar base of rigid material having an area defining an enclosed aperture sized to tightly and completely receive the striker and position the striker in the plane parallel to the base;

at least one magnet disposed on at least one surface of the base so as to hold the base adjacent to the door jamb, with the base being parallel to the door jamb thereby positioning the striker on the door jamb and restricting motion of the striker in the plane of the surface of the door jamb;

at least one resiliently deformable member disposed on a peripheral surface of the base;

a substantially C-shaped handle attached to the base, wherein the handle is capable of being positioned in a co-planar relationship to the base; and an elongated, substantially cylindrical member extending from at least one surface of the base, the elongated member engaging the aperture of the door jamb so as to prevent rotation of the striker when a torque load is applied to the striker;

wherein the magnet permits the base to move simultaneously with the striker when a sufficient force is applied against the striker in the plane parallel to the door jamb to overcome the magnet holding the base so that the position of the striker may be adjusted to a desired position;

wherein the at least one resiliently deformable member prevents excessive inboard movement of the base when the sufficient force is applied against the striker in the plane parallel to the door jamb.

2. The invention of claim 1, wherein the handle is pivotally attached to at least one surface of the base.

3. The invention of claim 1, wherein the handle is formed on at least one surface of the base.

4. The invention of claim 1, wherein the rigid material of the base is comprised of materials selected from the group consisting of metals, thermoplastics, and combinations thereof.

5. The invention of claim 1, wherein the magnet is comprised of materials selected from the group consisting of permanent magnets, electromagnets, and combinations thereof, the magnet having a magnetic force in the range of about 30 to about 1000 pounds.

* * * * *